United States Patent
Miyanaga et al.

(10) Patent No.: US 10,243,640 B2
(45) Date of Patent: Mar. 26, 2019

(54) PHASED ARRAY TRANSMISSION DEVICE AND CARRIER LEAK CORRECTION METHOD

(71) Applicant: Panasonic Intellectual Property Management Co., Ltd., Osaka (JP)

(72) Inventors: Kenji Miyanaga, Kanagawa (JP); Yukio Okazaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/454,261

(22) Filed: Mar. 9, 2017

(65) Prior Publication Data
US 2017/0288762 A1    Oct. 5, 2017

(30) Foreign Application Priority Data
Mar. 29, 2016  (JP) .................................. 2016-065428

(51) Int. Cl.
*G01S 7/40* (2006.01)
*H01Q 3/26* (2006.01)
(Continued)

(52) U.S. Cl.
CPC .......... *H04B 7/0682* (2013.01); *G01S 7/4008* (2013.01); *H01Q 3/267* (2013.01); *H04B 1/0475* (2013.01); *G01S 2013/0254* (2013.01)

(58) Field of Classification Search
CPC ...... H04B 1/04; H04B 1/0458; H04B 1/0475; H04B 1/0483; H04B 2001/0408; H04B 2001/0416; H04B 7/0628; H04B 7/068; H04B 7/0682; G01S 7/4008; G01S 2013/0254; H01Q 3/267
(Continued)

(56) References Cited

U.S. PATENT DOCUMENTS

2002/0033768 A1* 3/2002 Neeman .................... H01Q 3/38
                                                        342/372
2011/0134809 A1* 6/2011 Yu .......................... H04L 5/0048
                                                        370/277
(Continued)

FOREIGN PATENT DOCUMENTS

JP  8-213846     8/1996
JP  H08-213846   8/1996
(Continued)

*Primary Examiner* — Young T Tse
(74) *Attorney, Agent, or Firm* — Greenblum & Bernstein, P.L.C.

(57) ABSTRACT

Provided is a phased array transmission device including: a plurality of transmission branches, each being provided with a phase shift unit that applies a phase rotation to a baseband signal, a DC offset correction unit that adds a first correction value to an output signal of the phase shift unit, and a mixer that subjects an output signal of the DC offset correction unit to a frequency conversion to a high frequency band; and a correction control unit that calculates a second correction value with which a carrier leak component included in an output signal of the mixer is minimized, for each of a plurality of candidates for a phase rotation amount that is set for the phase rotation, and determines the first correction value on the basis of the second correction value.

14 Claims, 9 Drawing Sheets

(51) Int. Cl.
*H04B 1/04* (2006.01)
*H04B 7/06* (2006.01)
*G01S 13/02* (2006.01)

(58) Field of Classification Search
USPC ....... 375/135, 146, 260, 267, 295, 299, 297; 455/500, 501, 101, 103, 104, 116, 127.3
See application file for complete search history.

(56) References Cited

U.S. PATENT DOCUMENTS

2012/0280861 A1 11/2012 Kishimoto et al.
2014/0203969 A1* 7/2014 Maltsev .................. H01Q 3/36
342/375

FOREIGN PATENT DOCUMENTS

JP 5252094 5/2013
WO 2011/077617 6/2011

* cited by examiner

PHASED ARRAY TRANSMISSION DEVICE AND CARRIER LEAK CORRECTION METHOD

BACKGROUND

1. Technical Field

The present disclosure relates to a phased array transmission device and a carrier leak correction method in radio signal transmission using a phased array antenna.

2. Description of the Related Art

Phased array antenna technology is widely used in radio communication devices and radar devices. With this technology, it becomes possible to form a directional beam and to electronically scan a beam. For example, when applied to a radio communication device, antenna gain can be improved and the communication area can be expanded by forming a beam, or the coverage area can be dynamically controlled according to the number of accommodated users. Furthermore, when applied to a radar device, reflection (clutter reflection) from non-detection objects can be suppressed and object detection accuracy can be improved by radiating a detection object with a highly directional beam formed by a phased array antenna.

With phased array antenna technology, a desired directional gain can be obtained for an antenna by appropriately controlling the phases and amplitudes of a plurality of parallel transmission systems (hereinafter referred to as "transmission branches") that respectively supply power to a plurality of antenna elements arranged in an array form.

The configuration given in Japanese Patent No. 5252094, for example, is known as an example of a conventional phased array transmission device in which phased array technology is used. FIG. 1 is a block diagram depicting the configuration of the phased array transmission device disclosed in Japanese Patent No. 5252094. The phased array transmission device (transmitter 64) depicted in FIG. 1 is provided with a local signal amplifier 65, a plurality of baseband signal phase shifters 66-1 to 66-$h$, a plurality of quadrature modulators (mixers) 67-1 to 67-$h$, a plurality of transmission amplifiers 68-1 to 68-$h$, and a plurality of transmission antennas 69-1 to 69-$h$. The plurality of baseband signal phase shifters 66-1 to 66-$h$ control beam directionality by applying an appropriate phase rotation to each input baseband signal.

Furthermore, a carrier signal leak (carrier leak) is a factor for deterioration of the quality of transmitted radio signals. A carrier leak is an unnecessary component in reception processing, and therefore detection accuracy for reception signals deteriorates.

The configuration given in Japanese Unexamined Patent Application Publication No. 8-213846 is known as an example of a conventional device that performs a carrier leak correction. In the device disclosed in Japanese Unexamined Patent Application Publication No. 8-213846, a test signal having a fixed envelope is input to a mixer, and envelope detection is performed with respect to an output signal from the mixer to obtain an envelope signal. The amplitude of the envelope signal fluctuates when a carrier leak (=DC offset) has occurred, and the fluctuation in the amplitude of the envelope signal is no longer present when there is no carrier leak. Thus, a carrier leak correction is performed in such a way that the amplitude fluctuation of the envelope signal decreases.

SUMMARY

A nonrestrictive embodiment of the present disclosure facilitates providing a phased array transmission device and a carrier leak correction method with which it is possible to perform a carrier leak correction taking into consideration carrier leaks that fluctuate due to beam directionality switching.

In one general aspect, the techniques disclosed here feature a phased array transmission device provided with: a plurality of transmission branches, each being provided with a phase shift unit that applies a phase rotation to a baseband signal, a first DC offset correction unit that adds a first correction value to an output signal of the phase shift unit, and a mixer that subjects an output signal of the first DC offset correction unit to a frequency conversion to a high frequency band; and a correction control unit that calculates a second correction value with which a carrier leak component included in an output signal of the mixer is minimized, for each of a plurality of candidates for a phase rotation amount that is set for the phase rotation, and determines the first correction value on the basis of the second correction value.

It should be noted that general or specific aspects hereof may be realized by a system, a device, a method, an integrated circuit, a computer program, or a recording medium, and may be realized by an arbitrary combination of a system, a device, a method, an integrated circuit, a computer program, and a recording medium.

According to an aspect of the present disclosure, it is possible to perform a carrier leak correction taking into consideration carrier leaks that fluctuate due to beam directionality switching.

Additional benefits and advantages in the aspect of the present disclosure will become apparent from the specification and drawings. The benefits and/or advantages may each be provided by several of the embodiments and the features disclosed in the specification and drawings, and need not all be provided in order to obtain one or more of the same features.

DETAILED DESCRIPTION

The cause of a carrier leak occurring is generally a mixer imbalance, and therefore a DC offset correction unit is often provided at the stage prior to a mixer.

In contrast, the present inventors discovered the phenomenon that a DC offset occurs not only in a mixer but also in the path between a digital-analog converter (DAC) and a phase shift unit, and that a carrier leak fluctuates due to this DC offset when beam directionality is switched.

Figure 1:
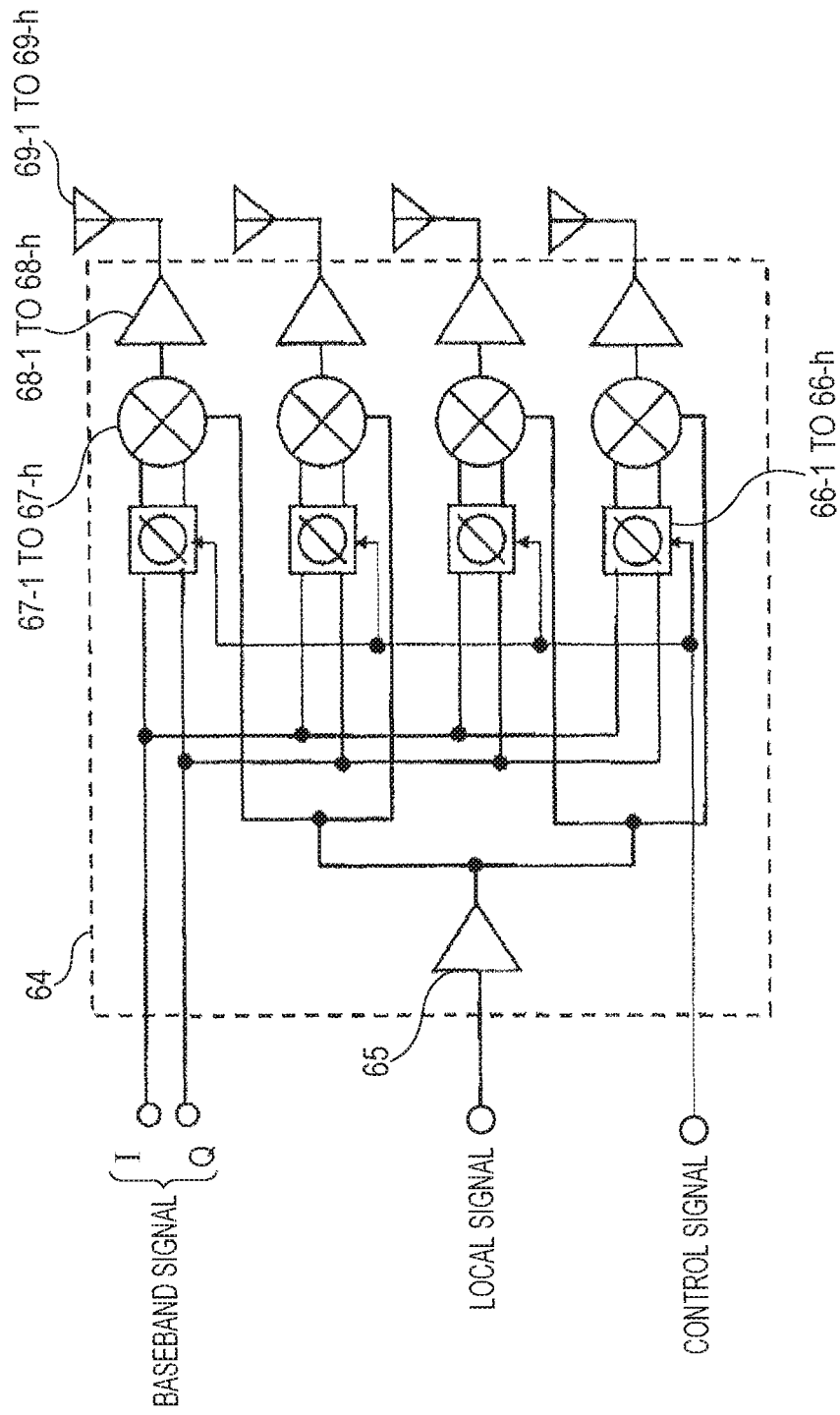
FIG. 1 depicts a configuration of a conventional phased array transmission device.

In other words, in a device such as that in FIG. 1, there are cases where a DC offset (that is, a carrier leak) occurs also in the path at the stage prior to a phase shift unit, and it is understood that this carrier leak fluctuates due to beam directionality switching performed by the phase shift unit. Therefore, in addition to a carrier leak occurring due to a mixer, it is necessary to take into consideration carrier leaks that fluctuate due to beam directionality switching.

Here, the mechanism with which a carrier leak fluctuates when beam directionality is switched will be described.

Figure 2:
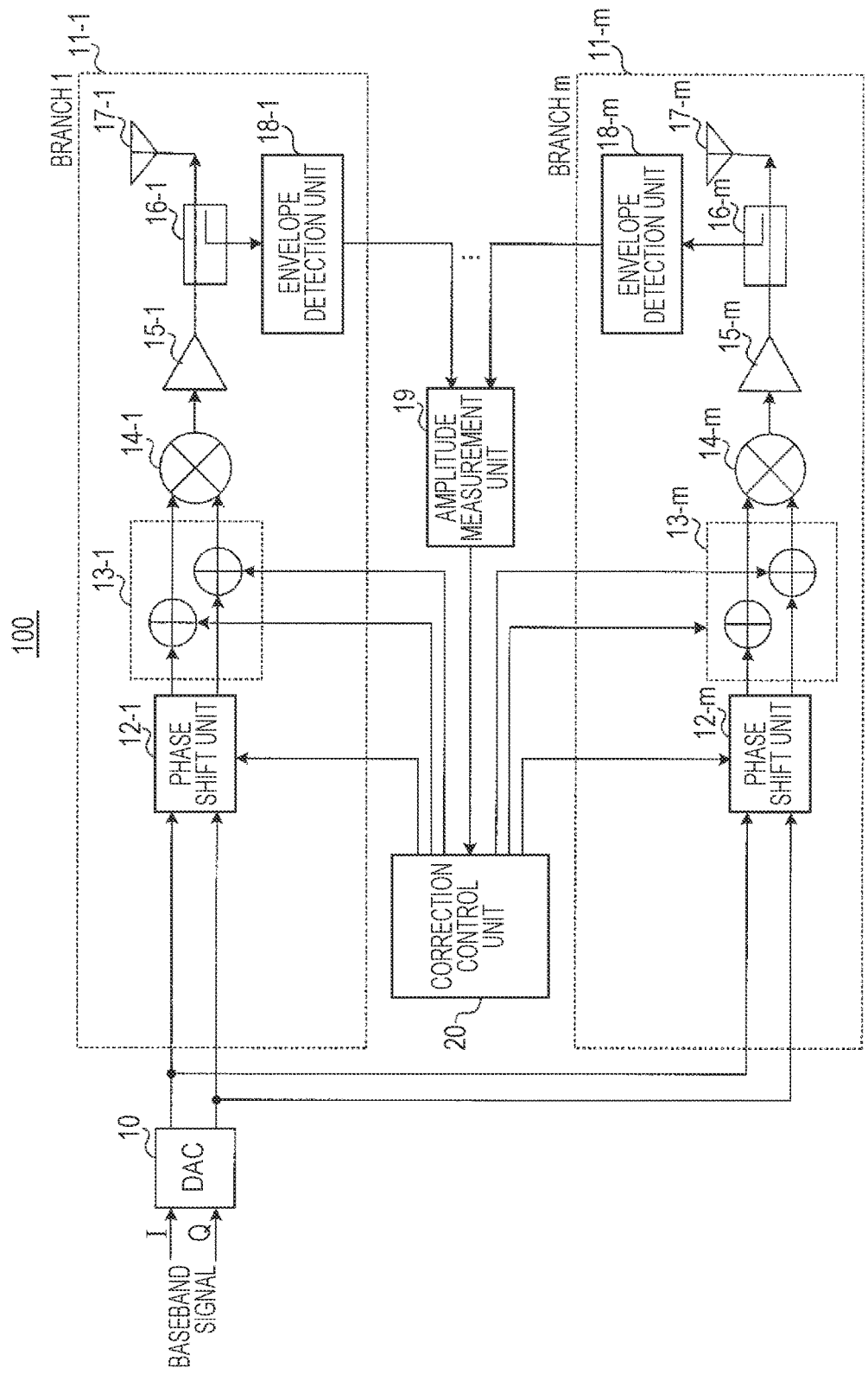
FIG. 2 depicts a configuration of a phased array transmission device according to embodiment 1 and embodiment 2 of the present disclosure.

FIG. 2 depicts a configuration example of a phased array transmission device in an aspect of the present disclosure. A phased array transmission device 100 depicted in FIG. 2 is provided with a DAC 10, a plurality of transmission branches 11-1 to 11-$m$, an amplitude measurement unit 19, and a correction control unit 20. The transmission branches 11-1 to 11-$m$ are provided with phase shift units 12-1 to 12-$m$, DC offset correction units 13-1 to 13-$m$, mixers 14-1 to 14-$m$, power amplifiers 15-1 to 15-$m$, directional couplers 16-1 to 16-$m$, antennas 17-1 to 17-$m$, and envelope detection units 18-1 to 18-$m$.

It should be noted that the internal configurations and operations of the transmission branches 11-1 to 11-$m$ are the same, and therefore, in the following explanation, the operation of the transmission branch 11-1 will be described.

The DAC 10 converts a baseband signal that is a digital signal into an analog signal, and outputs an analog baseband signal. The baseband signal is a complex signal expressed as an I-axis signal (real component) and a Q-axis signal (imaginary component).

When a carrier leak correction is performed, a test signal $s_0$ having a fixed envelope expressed by equation (1) is input to the DAC 10 as the baseband signal.

$$s_0 = A e^{j\omega_s t} \qquad \text{Equation (1)}$$

Here, A expresses amplitude and $\omega_s$ expresses angular frequency.

The analog baseband signal that is output from the DAC 10 is branched and input to the phase shift unit 12-1. At such time, a DC offset occurs in the path between the DAC 10 and the phase shift unit 12-1. Possible causes for the DC offset in the path between the DAC 10 and the phase shift unit 12-1 include variation in wiring length or wiring width, and variation in the performance of a buffer, an amplifier, or the like (not depicted).

When the DC offset that occurs in the path between the DAC 10 and the phase shift unit 12-1 is expressed as $d_1$ ($d_1$ is a complex number), a signal $s_1$ that is input to the phase shift unit 12-1 is expressed as in equation (2).

$$s_1 = A e^{j\omega_s t} d_1 \qquad \text{Equation (2)}$$

In order to obtain a desired beam directionality, the phase shift unit 12-1 applies an appropriate phase rotation to the input signal $s_1$. A signal $s_2$ that is output from the phase shift unit 12-1 is expressed as in equation (3).

$$s_2 = s_1 e^{j\theta} = A e^{j(\omega_s t + \theta)} + d_1 e^{j\theta} \qquad \text{Equation (3)}$$

Here, $\theta$ expresses a phase rotation amount applied by the phase shift unit 12-1, and is input from the correction control unit 20.

The DC offset correction unit 13-1 performs a DC offset correction with a correction value being added to the input signal $s_2$ (output signal of the phase shift unit 12-1). A correction value is independently set for the I-axis signal and the Q-axis signal. A signal $s_3$ that is output from the DC offset correction unit 13-1 is expressed as in equation (4).

$$s_3 = s_2 + d_2 = A e^{j(\omega_s t + \theta)} + d_1 e^{j\theta} + d_2 \qquad \text{Equation (4)}$$

Here, $d_2$ ($d_2$ is a complex number) expresses a correction value for a DC offset applied by the DC offset correction unit 13-1, and is input from the correction control unit 20.

The mixer 14-1 performs quadrature modulation with respect to the output signal from the DC offset correction unit 13-1, and up-converts (frequency conversion) to a high frequency band. When a DC offset that occurs at the mixer 14-1 is expressed as $d_3$ ($d_3$ is a complex number), a quadrature-modulated signal $s_4$ that is output from the mixer 14-1 is expressed as in equation (5).

$$s_4 = (s_3 + d_3) e^{j\omega_c t} = A e^{j(\omega_c t + \omega_s t + \theta)} + (d_1 e^{j\theta} + d_2 + d_3) e^{j\omega_c t} = A e^{j(\omega_c t + \omega_s t + \theta)} + d_{all} e^{j\omega_c t} \qquad \text{Equation (5)}$$

Here, $\omega_c$ expresses a carrier frequency. The first term in equation (5) expresses the original test signal component, and the second term expresses a DC offset (=carrier leak) component. $d_{all}$ of the second term in equation (5) is expressed as in equation (6).

$$d_{all} = d_1 e^{j\theta} + d_2 + d_3 \qquad \text{Equation (6)}$$

The power amplifier 15-1 amplifies the high-frequency signal that has been up-converted by the mixer 14-1, to a predetermined power. The amplified high-frequency signal is transmitted as a radio signal from the transmission antenna 17-1.

The directional coupler 16-1 retrieves a portion of the high-frequency signal amplified by the power amplifier 15-1, and outputs this to the envelope detection unit 18-1.

The envelope detection unit 18-1 performs envelope detection with respect to the signal retrieved by the directional coupler 16-1.

Figure 3:
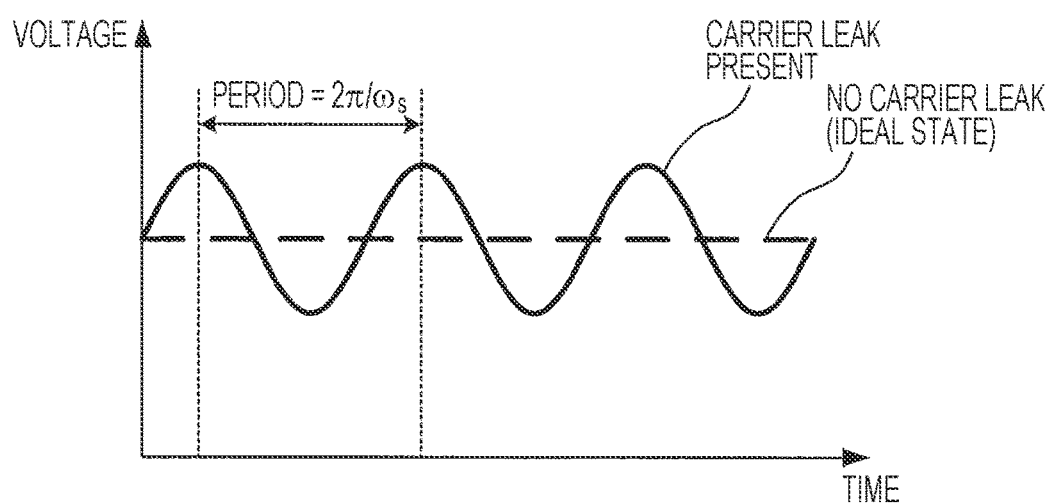
FIG. 3 depicts an example of an output waveform of an envelope detection unit.

FIG. 3 is a drawing depicting an example of an output waveform of the envelope detection unit 18-1.

In the case where a sinusoidal wave (where $\omega_s$ is angular frequency) of a fixed amplitude is input to the DAC 10 as a baseband signal, in an ideal state in which a carrier leak component is not included, the output waveform of the envelope detection unit 18-1 is fixed (dashed line in FIG. 3). On the other hand, in a state in which a carrier leak component is included, the output waveform of the envelope detection unit 18-1 becomes a signal that fluctuates at the angular frequency $\omega_s$, that is, a period=$2\pi/\omega_s$ (solid line in FIG. 3).

The amplitude measurement unit 19 extracts the angular frequency $\omega_s$ components from the output signals of the envelope detection units 18-1 to 18-$m$, and detects carrier leak components. For example, the amplitude measurement unit 19 may detect carrier leak components by detecting the largest values and smallest values of the output signals of the envelope detection units 18-1 to 18-$m$. Alternatively, the amplitude measurement unit 19 may extract a $\omega_s$ component corresponding to a carrier leak component using a fast Fourier transform (FFT), a filter, or the like.

The correction control unit 20 sets the phase rotation amount θ for the phase shift units 12-1 to 12-m. Furthermore, the correction control unit 20 adjusts the correction value $d_2$ that is set to the DC offset correction units 13-1 to 13-m, on the basis of the carrier leak component detected by the amplitude measurement unit 19.

From equation (6), it is clear that the DC offset component $d_{all}$ included in the output of the mixer 14-1 changes depending on the phase rotation amount θ of the phase shift unit 12-1. Hereinafter, the phenomenon expressed in equation (6) will be described in detail using FIGS. 4 and 5.

Figure 4:
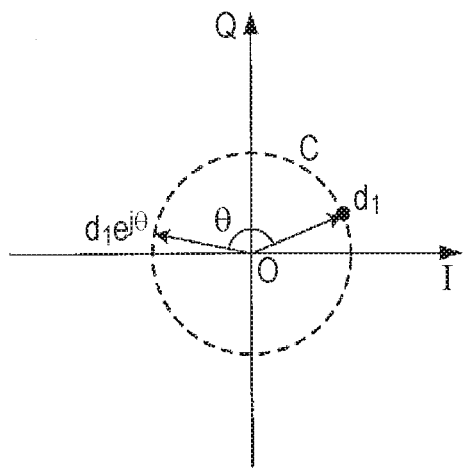
FIG. 4 depicts a DC offset output by a phase shift unit.

FIG. 4 is a drawing depicting a DC offset included in the signal $s_2$ that is output from the phase shift unit 12-1. The DC offset that is input to the phase shift unit 12-1 is expressed by $d_1$. As depicted in FIG. 4, the DC offset $d_1$ is also subjected to a phase rotation according to the phase rotation amount θ applied by the phase shift unit 12-1, and moves along the circumference C. For example, a $d_1$ state is entered in the case where a phase rotation is not implemented (θ=0), and a $d_1 e^{j\theta}$ state is entered in the case where the phase rotation θ is implemented.

Figure 5:
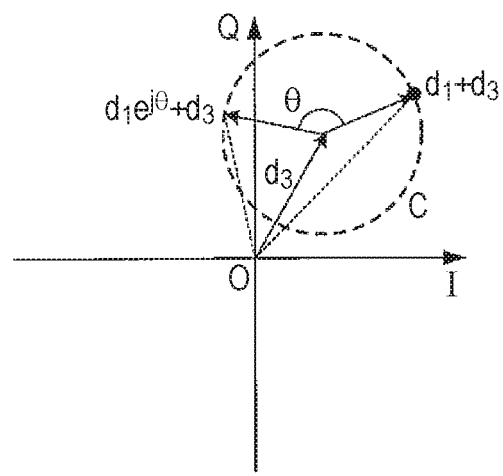
FIG. 5 depicts a DC offset output by a mixer.

FIG. 5 is a drawing depicting a DC offset included in the signal $s_4$ output from the mixer 14-1. It should be noted that, in FIG. 5, the correction value for the DC offset applied by the DC offset correction unit 13-1 is $d_2=0$ (that is, a state in which a DC offset correction is not performed). As depicted in FIG. 5, the DC offset included in the signal $s_4$ is in a state in which the DC offset $d_1$ that is input to the phase shift unit 12-1 and a DC offset $d_3$ that occurs at the mixer 14-1 are combined.

The distance between the origin O and the point on the circumference C depicted in FIG. 5 expresses the magnitude of the DC offset included in the signal $s_4$ that is output from the mixer 14-1. Here, the center of the circumference C depicted in FIG. 5 shifts from the origin O by the DC offset $d_3$. Thus, as depicted in FIG. 5, when the phase rotation amount θ changes, the magnitude (distance from the origin O) of the DC offset that moves along the circumference C also changes. For example, the DC offset is expressed as $d_1+d_3$ in the case where a phase rotation is not implemented (θ=0), and the DC offset is expressed as a $d_1 e^{j\theta}+d_3$ in the case where the phase rotation θ is implemented.

In this way, since the magnitude of the DC offset (that is, the carrier leak component) fluctuates depending on the phase rotation amount θ applied to the baseband signal by the phase shift unit 12-1, in a conventional carrier leak correction method in which the phase rotation amount θ is not taken into consideration, the reception performance of the receiving device deteriorates due to fluctuation in the carrier leak component.

Figure 6:
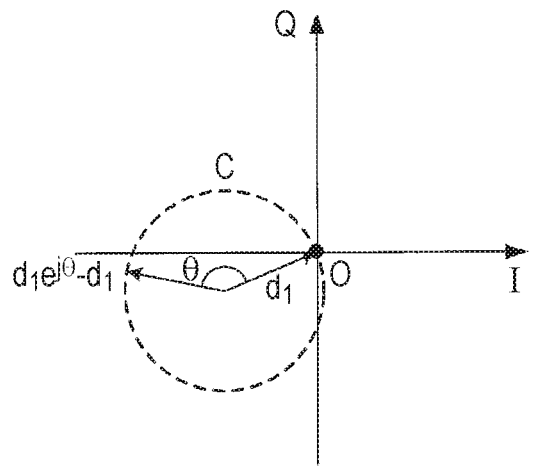
FIG. 6 depicts a DC offset in the case where a conventional carrier leak correction method is applied.

FIG. 6 is a drawing depicting an example of a DC offset in the case where a carrier leak correction has been performed in a state in which θ=0 in the conventional carrier leak correction method.

When a carrier leak correction (for example, the correction value $d_2=-(d_1+d_3)$) is performed in a state in which θ=0 (that is, the DC offset expressed as $d_1+d_3$ in FIG. 5), $d_1$ moves to the origin O. Thus, in a state in which θ=0, the carrier leak component becomes zero.

However, as depicted in FIG. 6, with a phase rotation amount other than θ=0, a carrier leak component ($d_1 e^{j\theta}-d_1$) is generated. In other words, in the conventional carrier leak correction method, the carrier leak component can be removed when the phase rotation amount θ of the phase shift unit 12-1 meets a specific condition (θ=0 in FIG. 6); however, the carrier leak component is not able to be removed when the phase rotation amount θ of the phase shift unit 12-1 changes due to beam directionality switching. That is, due to fluctuation in the carrier leak component corresponding to the phase rotation amount θ, there is fluctuation in the magnitude (amplitude of the sinusoidal wave) of the output waveform of the envelope detection unit 18-1 in the case depicted in FIG. 3 where a carrier leak is present (solid line), for example.

As mentioned above, in the conventional carrier leak correction method, there is a problem in that, in the case where beam directionality is switched, the carrier leak component included in the transmitted signal fluctuates due to the DC offset $d_1$ (that is, a DC offset that has been subjected to a phase rotation) that occurs at the stage prior to the phase shift unit 12-1. Thus, in the conventional carrier leak correction method, a carrier leak is not able to be sufficiently removed, and detection accuracy for reception signals in the receiving device deteriorates.

Furthermore, even if a carrier leak correction is performed with the phase rotation amount θ being changed to another value that is different from θ=0, the problem that the carrier leak amount fluctuates according to change in the phase rotation amount θ remains unsolved.

Thus, in a nonrestrictive embodiment of the present disclosure, fluctuation in the carrier leak component can be suppressed, or the carrier leak component can be suppressed, even when beam directionality is switched.

Hereinafter, an embodiment of a phased array transmission device according to the present disclosure will be described. It should be noted that, in the embodiments hereinafter, the same configurations are denoted by the same reference numbers, and explanations that overlap have been omitted. Hereinafter, a radio transmission device using phased array antenna technology (a radio transmission device provided with a phased array antenna) is described as a phased array transmission device.

Embodiment 1

The configuration of a phased array transmission device according to the present embodiment has the same basic configuration as the phased array transmission device 100 depicted in FIG. 2, and will therefore be described with reference to FIG. 2.

In the present embodiment, for each of a plurality of candidates for the phase rotation amount θ to be set for the phase rotation in the phase shift unit 12-1 (hereinafter, expressed as a phase setting $\theta_n$ (n=0, 1, N−1; N being an integer that is equal to or greater than 2)), the correction control unit 20 of the phased array transmission device 100 calculates a correction value ($d_{2n}$, described later on) with which the carrier leak component included in the output signal $s_4$ of the mixer 14-1 is minimized, and determines the correction value $d_2$ to be provided to the DC offset correction unit 13-1, on the basis of the calculated correction value $d_{2n}$.

It should be noted that, hereinafter, the internal configurations and operations of the transmission branches 11-11 to 11-m are the same, and therefore the operation of the transmission branch 11-1 will be described.

Hereinafter, an explanation will be given regarding the principle based upon which the correction value to be provided to the DC offset correction unit 13-1 is determined in the present embodiment.

Here, the case where N=2 will be described as an example. Two phase settings are taken as $\theta_0$ and $\theta_1$, with $\theta_0$ and $\theta_1$ being mutually different values.

The DC offset included in the signal $s_4$ that is output from the mixer 14-1 when the phase setting of the phase shift unit 12-1 is $\theta_0$ is, from equation (6), expressed as in equation (7).

$$d_{all}=d_1 e^{j\theta_0}+d_2+d_3 \qquad \text{Equation (7)}$$

The correction control unit 20 adjusts the correction value $d_2$ that is input to the DC offset correction unit 13-1, in such a way that the carrier leak component is minimized in this state (that is, so that $d_{all}=0$). A correction value $d_{20}$ that is obtained after the adjustment for the phase setting $\theta_0$ is expressed as in equation (8) by assigning $d_{all}=0$ in equation (7).

$$d_{20}=-d_1 e^{j\theta_0}-d_3 \qquad \text{Equation (8)}$$

Similarly, the DC offset included in the signal $s_4$ that is output from the mixer 14-1 when the phase setting of the phase shift unit 12-1 is $\theta_1$ is, from equation (6), expressed as in equation (9).

$$d_{all}=d_1 e^{j\theta_1}+d_2+d_3 \qquad \text{Equation (9)}$$

The correction control unit 20 adjusts the correction value $d_2$ that is input to the DC offset correction unit 13-1, in such a way that the carrier leak component is minimized in this state (that is, so that $d_{all}=0$). A correction value $d_{21}$ that is obtained after the adjustment for the phase setting $\theta_1$ is expressed as in equation (10) by assigning $d_{all}=0$ in equation (9).

$$d_{21}=d_1 e^{j\theta_1}-d_3 \qquad \text{Equation (10)}$$

The correction control unit 20 calculates equation (11) in such a way that the DC offset $d_1$ is negated, on the basis of the correction value $d_{20}$ and the correction value $d_{21}$ indicated in equations (8) and (10).

$$d_{20}-d_{21}e^{j(\theta_1-\theta_0)}=d_3(e^{j(\theta_1-\theta_0)}-1) \qquad \text{Equation (11)}$$

Thus, the DC offset $d_3$ that occurs at the mixer 14-1 is obtained as in equation (12).

$$d_3 = \frac{d_{20} - d_{21} e^{j(\theta_1 - \theta_0)}}{e^{j(\theta_1 - \theta_0)} - 1} \qquad \text{Equation (12)}$$

Here, the correction control unit 20 determines the correction value $d_2$ to be provided to the DC offset correction unit 13-1 as being $d_2=-d_3$ so that the DC offset $d_3$ expressed by equation (12) is removed. The DC offset correction unit 13-1 performs a DC offset correction using the correction value $d_2$. Thus, the DC offset (=carrier leak) indicated in equation (6) is expressed as in equation (13).

$$d_{all}=d_1 e^{j\theta} \qquad \text{Equation (13)}$$

The correction processing performed by this DC offset correction unit 13-1 corresponds to implementing the state depicted in FIG. 4 (a state in which the DC offset $d_3$ is removed and only the DC offset $d_1$ is included) from the state depicted in FIG. 5 (a state in which the DC offsets $d_1$ and $d_3$ are included). By doing this, after the DC offset correction, the DC offset component $d_{all}$ included in the signal $s_4$ that is output from the mixer 14-1 has the DC offset $d_3$ caused by the mixer 14-1 removed therefrom, and becomes a sinusoidal wave having the amplitude $|d_1|$.

Thus, even if beam directionality (phase rotation amount $\theta$) is switched by the phase shift unit 12-1, the amplitude of the DC offset component $d_{all}$ is fixed at $|d_1|$, and therefore the carrier leak amount does not change and becomes fixed. For example, the magnitude (amplitude of the sinusoidal wave) of the output waveform of the envelope detection unit 18-1 in the case where a carrier leak is present (solid line) depicted in FIG. 3 is fixed even if the phase rotation amount $\theta$ changes. By doing this, in the phased array transmission device 100, there is no fluctuation in the carrier leak component even if beam directionality is switched, and it is therefore possible to reduce the effect of fluctuation in the carrier leak component on detection accuracy for reception signals.

The case where N=2 has been described as an example; however, it should be noted that the present embodiment can be applied also in the case where N is equal to or greater than 3.

Specifically, the correction control unit 20 adjusts the correction value $d_2$ that is input to the DC offset correction unit 13-1, in such a way that the carrier leak component is minimized, for each of the plurality of phase settings $\theta_n$ (n=0, 1, N−1). The correction value $d_{2n}$ (correction candidate value) obtained after the adjustment for the phase setting $\theta_n$ is expressed as in equation (14).

$$d_{2n}=-d_1 e^{j\theta_n}-d_3 \qquad \text{Equation (14)}$$

Thus, N number of instances of equation (14) are obtained for the two unknowns $d_1$ and $d_3$, and therefore, if N is equal to or greater than 2, it is possible solve simultaneous equations for the two unknowns $d_1$ and $d_3$. Consequently, in the case where N is equal to or greater than 3, the correction control unit 20 can obtain the value of the DC offset $d_3$ by solving any two equations selected from the N number of instances of equation (14).

For example, in the case where N=3, three instances of equation (14) are obtained relating to the correction values $d_{20}$, $d_{21}$, and $d_{22}$ from after adjustments corresponding to each of the phase settings $\theta_0$, $\theta_1$, and $\theta_2$. Thus, the correction control unit 20 solves the three combinations of $d_{20}$ and $d_{21}$, $d_{21}$ and $d_{22}$, and $d_{22}$ and $d_{20}$, and the values of three instances of $d_3$ are obtained. The correction control unit 20 may determine the correction value $d_2$ (=−$d_3$) to be provided to the DC offset correction unit 13-1, using any one value from among the three $d_3$ values.

Alternatively, the correction control unit 20 may determine the correction value $d_2$ (=−$d_3$) to be provided to the DC offset correction unit 13-1 by obtaining the average value of the plurality of instances of $d_3$. The plurality of $d_3$ values obtained ideally coincide; however, realistically, it is expected that the obtained $d_3$ values will also vary due to noise or variation in circuit characteristics. Thus, the correction control unit 20 can reduce the effect of variation by averaging the plurality of $d_3$ values.

Hereinabove, the principle based upon which the correction value $d_2$ is determined in the present embodiment has been described.

Figure 7:
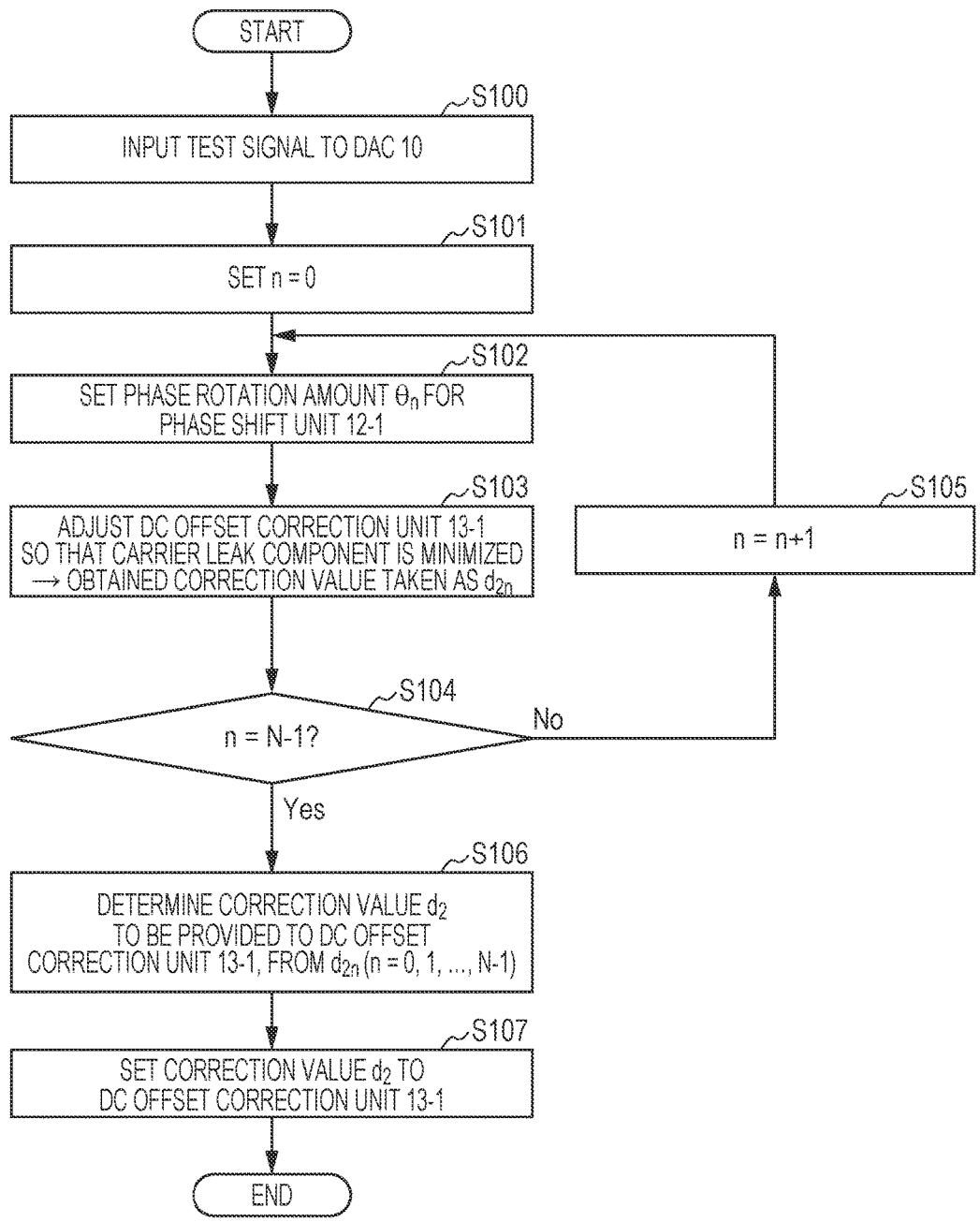
FIG. 7 depicts a carrier leak correction procedure according to embodiment 1 of the present disclosure.

Next, the carrier leak correction method of the phased array transmission device 100 in the present embodiment will be described. FIG. 7 is a flowchart depicting the carrier leak correction method of the phased array transmission device 100 in the present embodiment.

First, a test signal is input to the DAC 10 (step S100).

Next, the correction control unit 20 sets n=0 (initial value) for the phase setting $\theta_n$ (step S101).

Next, the correction control unit 20 sets the phase rotation amount for the phase shift unit 12-1 to $\theta_n$ (step S102).

Next, the correction control unit 20 adjusts the correction value $d_2$ that is input to the DC offset correction unit 13-1, in such a way that the carrier leak component is minimized, and takes the correction value that is obtained after the adjustment for the phase setting $\theta_n$ as $d_{2n}$ (step S103).

Next, the correction control unit 20 determines whether or not n=N−1 (step S104). If n=N−1 is not satisfied (step S104: no), the correction control unit 20 sets n=n+1 (step S105), and returns to the processing of step S102.

However, if n=N−1 is satisfied (step S104: yes), the correction control unit 20 calculates the DC offset $d_3$ on the basis of the correction value $d_{2n}$ (n=0, 1, N−1), and obtains the correction value $d_2$ ($=-d_3$) to be provided to the DC offset correction unit 13-1 using the calculated DC offset $d_3$ (step S106).

Lastly, the correction control unit 20 sets the correction value $d_2$ obtained in step S106 to the DC offset correction unit 13-1 (step S107).

As mentioned above, the phased array transmission device 100 according to the present embodiment adjusts correction values with which the DC offset is minimized with respect to a plurality of phase settings, and determines a correction value to be provided to the DC offset correction unit 13-1, on the basis of the plurality of correction values adjusted with respect to the plurality of phase settings.

Thus, in the present embodiment, even in the case where beam directionality (phase rotation amount θ) is switched in the phased array transmission device 100, fluctuation in the carrier leak component caused by the DC offset $d_1$ that occurs at the stage prior to the phase shift unit 12-1 can be suppressed while also removing the DC offset $d_3$ that occurs at the mixer 14-1, and therefore deterioration in detection accuracy for reception signals in a receiving device can be suppressed.

Embodiment 2

The configuration of a phased array transmission device according to the present embodiment has the same basic configuration as the phased array transmission device 100 depicted in FIG. 2, and will therefore be described with reference to FIG. 2.

Furthermore, the carrier leak correction method of the phased array transmission device 100 in the present embodiment is the same as the flowchart depicted in FIG. 7, and therefore an explanation thereof has been omitted.

In the present embodiment, the phased array transmission device 100 (correction control unit 20) adjusts each correction value $d_{2n}$ with which a DC offset is minimized with respect to a plurality of phase settings $\theta_n$ expressed by equation (15), and determines the correction value $d_2$ to be provided to the DC offset correction unit 13-1, on the basis of each adjusted correction value $d_{2n}$.

$$\theta_n = \frac{2\pi}{N}n + \theta_a \qquad \text{Equation (15)}$$

(where n=0, 1, N−1; N is an integer that is equal to or greater than 2; and θa is an arbitrary phase)

That is, in the present embodiment, a value obtained by one period (2π) being divided by N is set for each of the plurality of phase settings $\theta_n$.

The DC offset included in the signal $s_4$ that is output from the mixer 14-1 when the phase setting of the phase shift unit 12-1 is $\theta_n$ is, from equation (6), expressed as in equation (16).

$$d_{all} = d_1 e^{j\theta_n} + d_2 + d_3 \qquad \text{Equation (16)}$$

The correction control unit 20 adjusts the correction value $d_2$ that is input to the DC offset correction unit 13-1, in such a way that the carrier leak component is minimized in this state (that is, so that $d_{all}=0$). The correction value $d_{2n}$ that is obtained after the adjustment for the phase setting $\theta_n$ is expressed as in equation (17) by assigning $d_{all}=0$ in equation (16).

$$d_{2n} = -d_1 e^{j\theta_n} - d_3 \qquad \text{Equation (17)}$$

The correction control unit 20 then, as in equation (18), obtains the average value of the N number of correction values $d_{2n}$ obtained after the adjustment.

$$\frac{1}{N}\sum_{n=0}^{N-1} d_{2n} = \frac{1}{N}\sum_{n=0}^{N-1}\left(-d_1 e^{j\left(\frac{2\pi}{N}n+\theta_0\right)} - d_3\right) = -\frac{d_1}{N}e^{j\theta_0}\sum_{n=0}^{N-1} e^{j\frac{2\pi}{N}} - d_3 \qquad \text{Equation (18)}$$

The first term of equation (18) becomes zero due to becoming the sum of N number of terms of the geometric progression with initial term "$-(d_1/N)e^{j\theta_a}$" and common ratio "$e^{j(2\pi/N)}$". Consequently, equation (18) is expressed by equation (19).

$$d_3 = -\frac{1}{N}\sum_{n=0}^{N-1} d_{2n} \qquad \text{Equation (19)}$$

That is, the correction control unit 20 is able to obtain the DC offset $d_3$ that occurs at the mixer 14-1, on the basis of the average value for the correction values $d_{2n}$.

The correction control unit 20 sets the correction value $d_2$ to be provided to the DC offset correction unit 13-1 as being $d_2 = -d_3$ so that the DC offset $d_3$ expressed by equation (19) is removed. The DC offset correction unit 13-1 performs a DC offset correction using the correction value $d_2$.

Thus, as in embodiment 1, after the DC offset correction, the DC offset component included in the signal $s_4$ that is output from the mixer 14-1 is expressed as in equation (13). That is, the DC offset $d_3$ caused by the mixer 14-1 is removed by the DC offset correction unit 13-1, and therefore the DC offset component $d_{all}$ becomes a sinusoidal wave having the amplitude $|d_1|$. Thus, as in embodiment 1, the carrier leak amount can be fixed even if beam directionality (phase rotation amount θ) is switched by the phase shift unit 12-1.

Thus, even in the case where beam directionality (phase rotation amount θ) is switched in the phased array transmission device 100, fluctuation in the carrier leak component caused by the DC offset $d_1$ that occurs at the stage prior to the phase shift unit 12-1 can be suppressed while also removing the DC offset $d_3$ that occurs at the mixer 14-1, and therefore deterioration in detection accuracy for reception signals in a receiving device can be suppressed.

In the case where N=2 (for example, $\theta_0=0$ and $\theta_1=\pi$), in particular, equation (19) is expressed as in equation (20).

$$d_3 = -\frac{d_{20} + d_{21}}{2} \qquad \text{Equation (20)}$$

In this case, the correction value $d_2$ set in the DC offset correction unit 13-1 is expressed as in equation (21).

$$d_2 = -d_3 = \frac{d_{20} + d_{21}}{2} \qquad \text{Equation (21)}$$

In other words, in the present embodiment, the correction value $d_2$ set in the DC offset correction unit 13-1 is obtained from a step in which the correction value $d_{20}$ is obtained, a step in which the correction value $d_{21}$ is obtained, and a step in which the average value for $d_{20}$ and $d_2 1$ is obtained. The processing for obtaining the DC offset $d_3$ from $d_{20}$ and $d_{21}$ (the processing of step S106 in FIG. 7), in particular, can be performed by means of average value calculation processing, and can be easily realized compared to embodiment 1. Thus, according to the present embodiment, in the phased array transmission device 100, the time (processing amount) required to correct a carrier leak can be reduced further than in embodiment 1.

Embodiment 3

In embodiments 1 and 2, a DC offset is corrected in such a way that a carrier leak component does not fluctuate in the case where beam directionality is switched. In contrast, in the present embodiment, an explanation will be given regarding a method with which, in addition, a DC offset is corrected in such a way that a DC offset that occurs at the stage prior to the phase shift unit 12-1 is removed.

Figure 8:
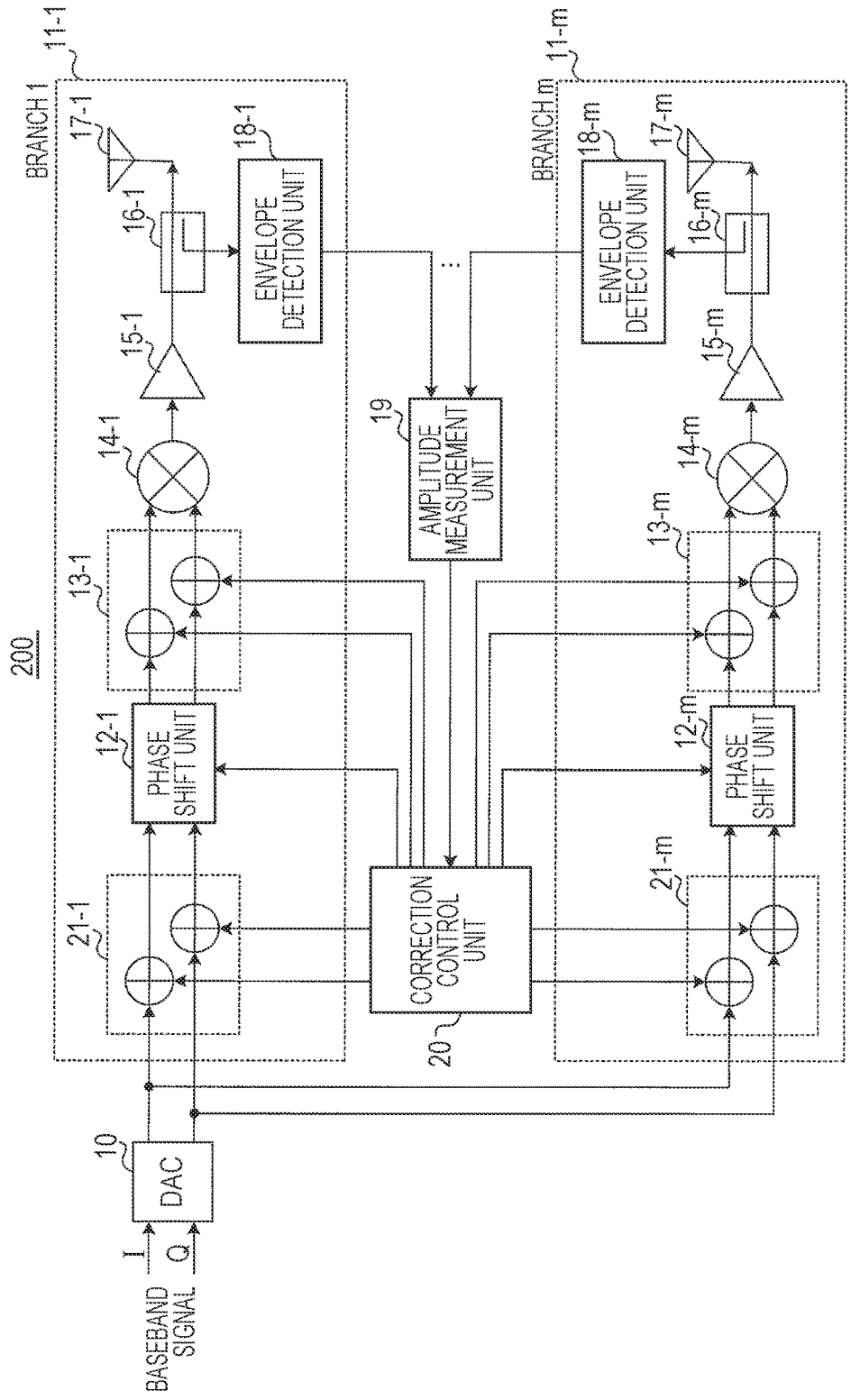
FIG. 8 depicts a configuration of a phased array transmission device according to embodiment 3 of the present disclosure.

FIG. 8 is a block diagram depicting the configuration of a phased array transmission device 200 according to the present embodiment. It should be noted that, in FIG. 8, configuration parts that are the same as those in FIG. 2 are denoted by the same reference numbers, and explanations thereof have been omitted. In FIG. 8, the difference from FIG. 2 is that DC offset correction units 21-1 to 21-$m$ have been respectively added to the stage prior to the phase shift units 12-1 to 12-$m$.

It should be noted that the internal configurations and operations of the transmission branches 11-1 to 11-$m$ are the same, and therefore, in the following explanation, the operation of the transmission branch 11-1 will be described.

The DC offset correction unit 21-1 applies a correction value to an analog baseband signal (that is, a baseband signal from prior to a phase rotation) branched from the DAC 10, and outputs the corrected signal to the phase shift unit 12-1.

The correction control unit 20, in addition to the operation of embodiment 1, determines the correction values to be set to the DC offset correction units 21-1 to 21-$m$. Specifically, the correction control unit 20 determines a correction value (that is, $-d_1$) in such a way that the DC offset $d_1$ that occurs at the stage prior to the phase shift unit 12-1 is removed, using the correction value $d_{2n}$ obtained with respect to each of the plurality of phase settings $\theta_n$.

Hereinafter, an explanation will be given regarding a method with which the correction value to be provided to the DC offset correction unit 21-1 is obtained.

Here, in the case where N=2, the correction control unit 20 obtains the correction value $d_2$ ($=-d_3$) to be provided to the DC offset correction unit 13-1, in accordance with equation (12) described in embodiment 1.

As in embodiment 1, the correction control unit 20 adjusts the correction value $d_2$ that is input to the DC offset correction unit 13-1, in such a way that the carrier leak component is minimized for each of the two phase settings $\theta_0$ and $\theta_1$. The correction values $d_{20}$ and $d_{21}$ obtained after the adjustment for each of the phase settings $\theta_0$ and $\theta_1$ are expressed as in equations (8) and (10).

Here, the correction control unit 20 calculates equation (22) in such a way that the DC offset $d_3$ is negated, on the basis of the correction value $d_{20}$ and the correction value $d_{21}$ indicated in equations (8) and (10).

$$d_{20} - d_{21} = d_1(e^{j\theta_1} - e^{j\theta_n}) \qquad \text{Equation (22)}$$

Thus, the DC offset $d_1$ that occurs at the stage prior to the phase shift unit 12-1 is obtained as in equation (23).

$$d_1 = \frac{d_{20} - d_{21}}{e^{j\theta_1} - e^{j\theta_0}} \qquad \text{Equation (23)}$$

Thus, the correction control unit 20 determines the correction value to be provided to the DC offset correction unit 21-1 as being $-d_1$ so that the DC offset $d_1$ expressed by equation (23) is removed. The DC offset correction unit 21-1 performs a DC offset correction using the correction value $-d_1$.

Thus, the DC offset $d_1$ is removed prior to a phase rotation at the DC offset correction unit 21-1, and the DC offset $d_3$ caused by the mixer 14-1 is removed at the DC offset correction unit 13-1, and therefore the DC offset component $d_{all}$ expressed by equation (6) becomes zero.

By doing this, in the phased array transmission device 200, a carrier leak component is removed even if beam directionality is switched, and therefore it is possible to prevent deterioration in detection accuracy for reception signals caused by fluctuation in the carrier leak component.

Next, the carrier leak correction method of the phased array transmission device 200 in the present embodiment will be described.

Figure 9:
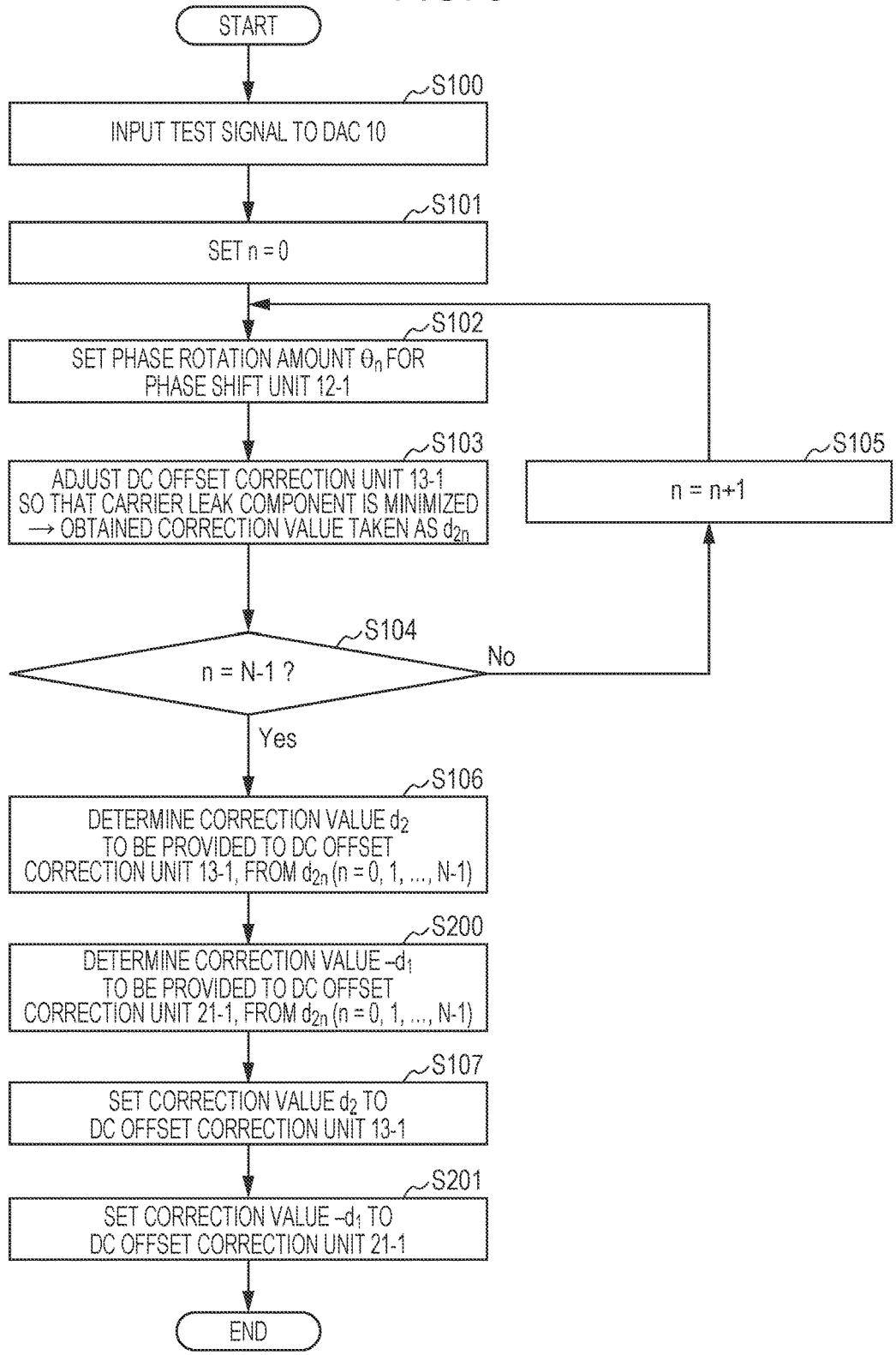
FIG. 9 depicts a carrier leak correction procedure according to embodiment 3 of the present disclosure.

FIG. 9 is a flowchart depicting the carrier leak correction method of the phased array transmission device 200 in the present embodiment. It should be noted that, in FIG. 9, the same operations as in embodiment 1 (FIG. 7) are denoted by the same reference numbers, and explanations thereof have been omitted.

The correction control unit 20 obtains the correction value $-d_1$ to be provided to the DC offset correction unit 21-1, on the basis of the correction value $d_{2n}$ (n=0, 1, N-1) obtained in step S103 (step S200). The correction control unit 20 then sets the correction value $-d_1$ obtained in step S200 to the DC offset correction unit 21-1 (step S201).

It should be noted that, in FIG. 9, the order of step S106 and step S200 may be switched, and the order of step S107 and step S201 may be switched.

In this way, in the present embodiment, in the phased array transmission device 200, by adding the DC offset correction unit 21-1, it becomes possible to correct not only the DC offset that occurs at the mixer 14-1 but also the DC offset that occurs at the stage prior to the phase shift unit 12-1. Thus, according to the present embodiment, even in the case where beam directionality (phase rotation amount θ) is switched in the phased array transmission device 200, both the DC offset $d_1$ that occurs at the stage prior to the phase shift unit 12-1 and the DC offset $d_3$ that occurs at the mixer 14-1 can be removed, and therefore deterioration in detection accuracy for reception signals in a receiving device can be suppressed.

Variation 1 of Embodiment 3

In the case where $\theta_0$ and $\theta_1$ are selected in such a way that the phase difference between $\theta_0$ and $\theta_1$ becomes π, in particular, in the case where $\theta_0=0$ and $\theta_1=\pi$, for example, equation (23) becomes as in equation (24).

$$d_1 = -\frac{d_{20} - d_{21}}{2} \quad \text{Equation (24)}$$

Thus, the correction control unit 20 can obtain the correction value $-d_1$ to be provided to the DC offset correction unit 21-1, by means of a calculation that is simpler than equation (23).

Variation 2 of Embodiment 3

A method such as the following is another example for obtaining the DC offset $d_1$.

As previously mentioned, the correction value $d_{2n}$ obtained for the plurality of phase settings $\theta_n$ is expressed by equation (14).

Here, equation (25) is produced when equation (14) is modified.

$$d_1 = e^{-j\theta_n}(-d_{2n} - d_3) \quad \text{Equation (25)}$$

$d_3$ is obtained by means of the method described in embodiments 1 and 2. Thus, with respect to a certain n (for example, n=1), the correction control unit 20 can obtain the DC offset $d_1$ that occurs at the stage prior to the phase shift unit 12-1, by assigning $d_{2n}$ and $d_3$.

Variation 3 of Embodiment 3

A method such as the following is another method for obtaining the DC offset $d_1$. In the case where a plurality of phase settings $\theta_n$ expressed by equation (15) are used, the correction control unit 20 performs the calculation of equation (26) with respect to the correction value $d_{2n}$ (n=0, 1, N−1).

$$\frac{1}{N}\sum_{n=0}^{N-1} d_{2n}e^{-j\theta_0} = \quad \text{Equation (26)}$$

$$\frac{1}{N}\sum_{n=0}^{N-1}\left(-d_1 - d_3 e^{-j\left(\frac{2\pi}{N}n + \theta_0\right)}\right) = -d_1 - \frac{d_3}{N}e^{-j\theta_0}\sum_{n=0}^{N-1} e^{-j\frac{2\pi}{N}n}$$

The second term of equation (26) becomes zero due to becoming the sum of N number of terms of the geometric progression with initial term "$-(d_3/N)e^{-j\theta_a}$" and common ratio "$e^{-j(2\pi/N)}$". Consequently, equation (26) is expressed by equation (27).

$$d_1 = -\frac{1}{N}\sum_{n=0}^{N-1} d_{2n}e^{-j\theta_n} \quad \text{Equation (27)}$$

Thus, the correction control unit 20 can obtain the correction value $-d_1$ to be provided to the DC offset correction unit 21-1. As in variation 3, the correction control unit 20 obtains the DC offset $d_1$ using N number of correction values $d_{2n}$, and can thereby increase the accuracy of the correction value $-d_1$ compared to the case where equation (25) is used.

In the case where N=2, in particular, equation (27) becomes equation (24), and the correction control unit 20 can obtain the correction value to be provided to the DC offset correction unit 21-1, by means of simple processing.

Embodiment 4

Figure 10:
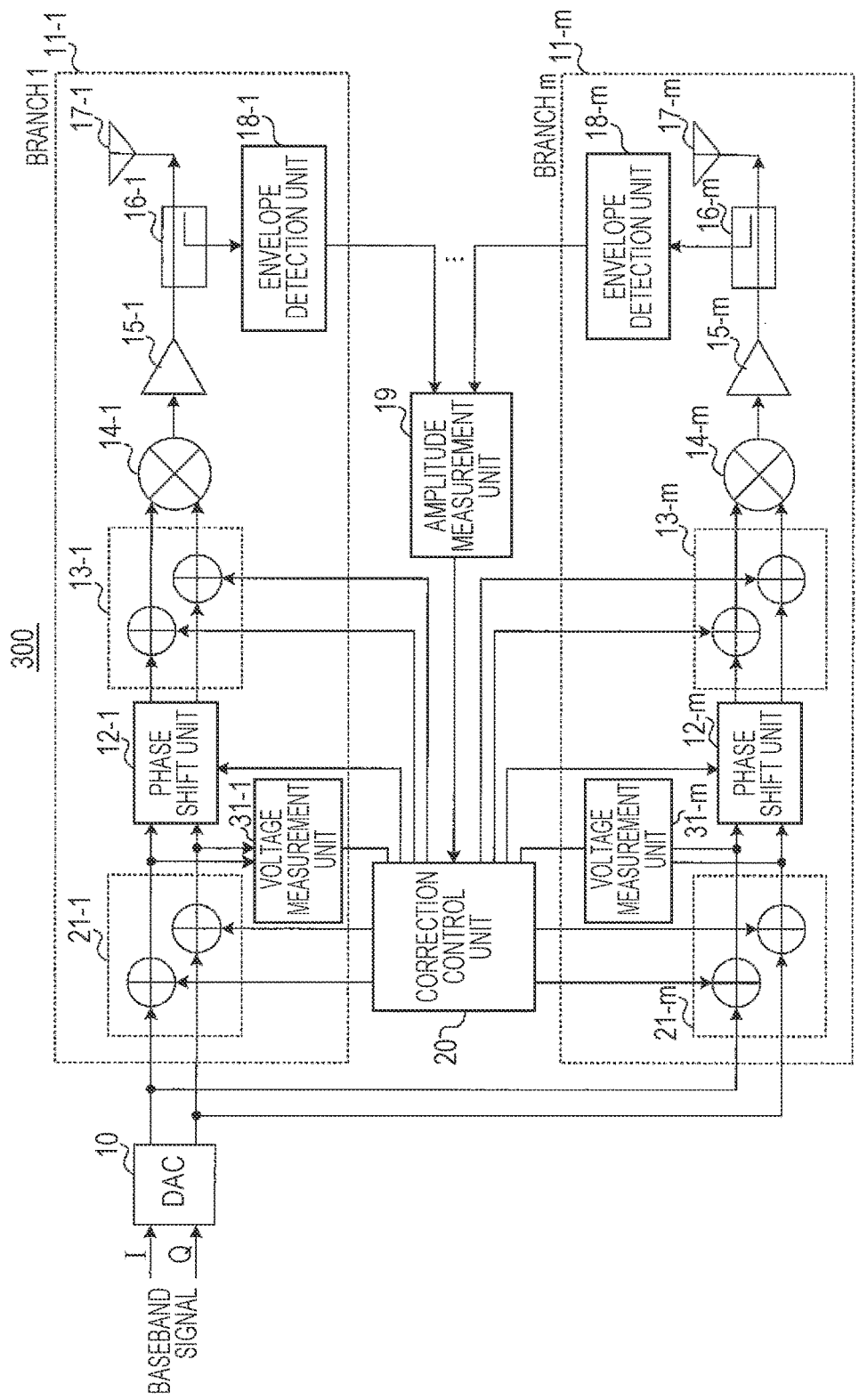
FIG. 10 depicts a configuration of a phased array transmission device according to embodiment 4 of the present disclosure.

FIG. 10 is a block diagram depicting the configuration of a phased array transmission device 300 according to the present embodiment. It should be noted that, in FIG. 10, configuration parts that are the same as those in FIGS. 2 and 8 are denoted by the same reference numbers, and explanations thereof have been omitted.

In FIG. 10, the difference from FIG. 8 is that voltage measurement units 31-1 to 31-m for directly detecting the DC offset of the signals that are input to the phase shift units 12-1 to 12-m have been added.

Furthermore, the internal configurations and operations of the transmission branches 11-1 to 11-m are the same, and therefore, in the following explanation, the operation of the transmission branch 11-1 will be described.

The voltage measurement unit 31-1 measures the output voltage of the DC offset correction unit 21-1, and thereby detects the DC offset that occurs at the stage prior to the phase shift unit 12-1. That is, the voltage measurement unit 31-1 measures voltage values of each of the I-axis signal and Q-axis signal (in other words, the baseband signal from prior to a phase rotation) that are input to the phase shift unit 12-1. Furthermore, in the case where the I-axis signal and Q-axis signal are each configured as differential signals, the voltage measurement unit 31-1 measures the voltages of both the differential signals.

The correction control unit 20 controls the correction value to be provided to the DC offset correction unit 21-1, in such a way that said DC offset is removed, in accordance with the voltage value (DC offset) that is input from the voltage measurement unit 31-1. The DC offset correction unit 21-1 performs a DC offset correction by applying the correction value that is input from the correction control unit 20 to the analog baseband signal.

Furthermore, the correction control unit 20 determines the correction value $d_2$ in such a way that the DC offset that occurs at the mixer 14-1 is removed, after the DC offset correction unit 21-1 has performed a DC offset correction using the correction value $d_1$. To paraphrase, the correction control unit 20 determines the correction value $d_2$ for removing the DC offset that occurs at the mixer 14-1, in a state in which the DC offset that occurs at the stage prior to the phase shift unit 12-1 has been removed.

Next, the carrier leak correction method of the phased array transmission device 300 in the present embodiment will be described.

Figure 11:
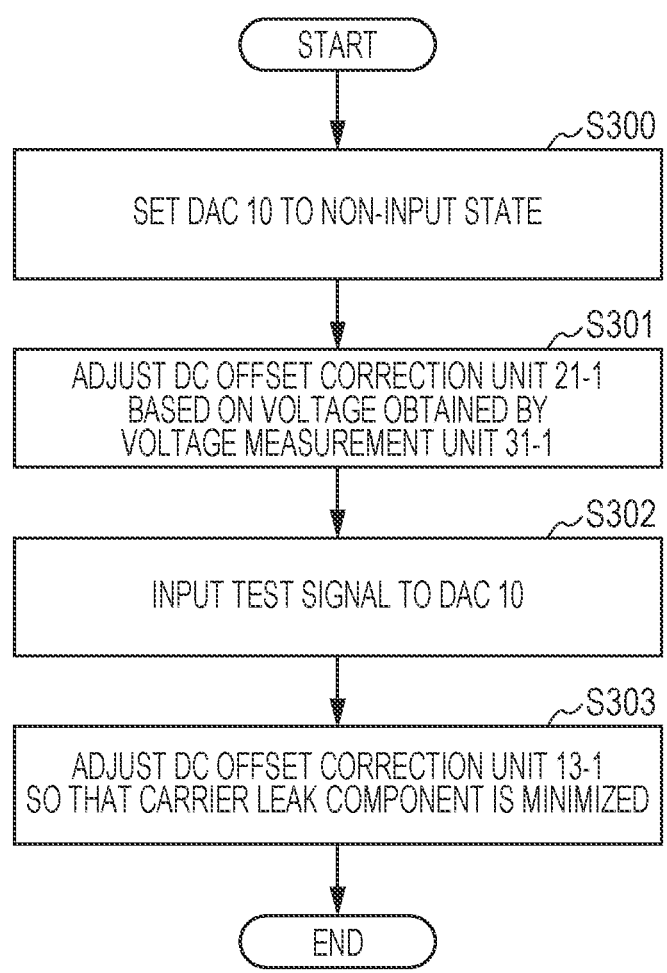
FIG. 11 depicts a carrier leak correction procedure according to embodiment 4 of the present disclosure.

FIG. 11 is a flowchart depicting the carrier leak correction method of the phased array transmission device 300 in the present embodiment.

First, the baseband signal that is input to the DAC 10 is put into a non-signal state (step S300). Thus, a voltage value that is measured by the voltage measurement unit 31-1 in the non-signal state becomes a value expressing a DC offset that occurs at the stage prior to the phase shift unit 12-1.

Next, the correction control unit 20 adjusts the DC offset correction unit 21-1 in such a way that the DC offset that occurs at the stage prior to the phase shift unit 12-1 is removed, on the basis of the DC offset (voltage value) measured by the voltage measurement unit 31-1 (step S301). For example, the correction control unit 20 may determine the correction value $-d_1$ for the DC offset correction unit 21-1, on the basis of the DC offset $d_1$ measured by the voltage measurement unit 31-1.

Next, a test signal is input to the DAC 10 (step S302).

Lastly, the correction control unit 20 adjusts the DC offset correction unit 13-1 in such a way that the carrier leak component is minimized (step S303).

Here, due to the processing of step S301, in the phased array transmission device 300, a state is entered in which the DC offset that occurs at the stage prior to the phase shift unit 12-1 has been removed. Thus, in step S303, the phased array transmission device 300 can remove the DC offset $d_3$ that occurs at the mixer 14-1, without taking into consideration the phase rotation for the DC offset $d_1$ performed by the phase shift unit 12-1 (for example, see FIG. 5).

In this way, in the present embodiment, in the phased array transmission device 300, by providing the voltage measurement unit 31-1, it is possible to directly detect the DC offset (voltage value) that occurs at the stage prior to the phase shift unit 12-1, and adjust the DC offset in such a way that the detected DC offset is removed. Furthermore, the phased array transmission device 300, by adjusting the DC offset in the DC offset correction unit 13-1 after having adjusted the DC offset that occurs at the stage prior to the phase shift unit 12-1, can sufficiently suppress carrier leaks of the entire transmission branch.

Hereinabove, embodiments of the present disclosure have been described.

It should be noted that the flowcharts of FIGS. 7, 9, and 11 depict methods for correcting DC offsets for the one transmission branch 11-1, and it is possible for the DC offsets to be corrected with the same method also for the remaining transmission branches 11-2 to 11-$m$.

Furthermore, while a DC offset correction is being performed in any of the transmission branches from among the transmission branches 11-1 to 11-$m$, a power source for the other transmission branches for which the DC offset correction is not being performed may be put into an off state or may be put into an on state. By putting a power source for the other transmission branches for which the DC offset correction is not being performed into an off state, it is possible to suppress the power consumption of the phased array transmission device during the correction. On the other hand, by putting a power source for the other transmission branches for which the DC offset correction is not being performed into an on state, it is possible to perform the DC offset correction at a temperature that is the same as during normal operation. In the case where a carrier leak fluctuates in terms of temperature, by performing a correction with all of the transmission branches being in an on state, it is possible to maintain a state in which carrier leaks are suppressed even during normal operation.

Furthermore, while a DC offset correction is being performed for any of the transmission branches from among the transmission branches 11-1 to 11-$m$, in the case where a power source for the other transmission branches for which the DC offset correction is not being performed is put into an on state, the power amplifiers 15-1 to 15-$m$ of the transmission branches for which the DC offset correction is not being performed may be put into an off state. Alternatively, in the case where antenna switches (not depicted) are provided between the power amplifiers 15-1 to 15-$m$ and the transmission antennas 17-1 to 17-$m$, and a power source for transmission branches for which the DC offset correction is not being performed from among the transmission branches 11-1 to 11-$m$ is put into an on state, the antenna switches may be put into an off state. In the case where a sneak path occurs among the transmission antennas 17-1 to 17-$m$, there is a possibility of a signal of a transmission branch that is not being corrected entering transmission branches 11 that are being corrected, interference occurring, and it not being possible for a correction to be performed correctly. In contrast, by putting the power amplifiers 15-1 to 15-$m$ or antenna switches of the transmission branches 11 that are not being corrected into an off state, it is possible to suppress interference to the transmission branches 11 that are being corrected.

Furthermore, the timing at which a carrier leak correction is performed may be when a power source is activated, or may be during normal operation provided that it is a timing at which there is no effect on the original function of the phased array transmission device. Furthermore, a carrier leak correction may be performed either when a power source is activated or during normal operation. For example, in the case where the ambient temperature changes considerably during operation, the carrier leak amount also changes, and it is assumed that previously obtained correction values are no longer optimal. In this kind of case, when a temperature sensor has been provided within the phased array transmission device and the temperature detected by the temperature sensor has changed by a fixed amount or more, the correction control unit 20 may perform a carrier leak correction once again. Alternatively, the carrier leak amount may be periodically confirmed by periodically applying a test signal for performing a carrier leak correction to the baseband signal, and performing a carrier leak correction once again if the carrier leak amount has increased.

Furthermore, the aforementioned embodiments describe examples of cases where an aspect of the present disclosure has been configured by means of hardware; however, it is also possible for the present disclosure to be realized by means of software in cooperation with hardware.

Furthermore, each functional block used in the explanations of the aforementioned embodiments is typically realized as an LSI, which is an integrated circuit having an input terminal and an output terminal. The integrated circuits may control each functional block used in the explanation of the aforementioned embodiments, and may be provided with an input terminal and an output terminal. These may be implemented separately as single chips or may be implemented as a single chip in such a way as to include some or all of the functional blocks. An LSI has been mentioned here; however, a functional block may be referred to as an IC, a system LSI, a super LSI, or an ultra LSI depending on the difference in the degree of integration.

Furthermore, the circuit integration technique is not limited to an LSI, and a functional block may be realized using a dedicated circuit or a general-purpose processor. After an LSI has been manufactured, a field-programmable gate array (FPGA) that can be programmed, or a reconfigurable processor with which the connections and settings of circuits cells within the LSI can be reconfigured, may be used.

In addition, if circuit integration technology that replaces LSI appears as a result of another technology that is an advancement in semiconductor technology or is derived therefrom, naturally, the other technology may be used to carry out the integration of functional blocks. The application and so forth of biotechnology is also a possibility.

What is claimed is:

1. A phased array transmission device, comprising:
a plurality of transmission branches, each being provided with
a phase shifter that applies a phase rotation to a baseband signal,
a first DC offset corrector that performs a first DC offset correction by adding a first correction value to an output signal of the phase shifter, and
a mixer that performs quadrature modulation with respect to an output signal of the first DC offset corrector and up-converts a frequency conversion to a high frequency band; and
a correction controller that calculates a second correction value with which a carrier leak component included in an output signal of the mixer is minimized, for each of a plurality of candidates for a phase rotation amount that is set for the phase rotation, and determines the first correction value on the basis of the second correction value.

2. The phased array transmission device according to claim 1,
wherein the correction controller determines the first correction value in such a way that a DC offset that occurs at the mixer is removed.

3. The phased array transmission device according to claim 1,
wherein each of the transmission branches is further provided with a second DC offset corrector that performs a second DC offset correction by adding a third correction value to the baseband signal from prior to the phase rotation, and
the correction controller determines the third correction value on the basis of the plurality of candidates.

4. The phased array transmission device according to claim 3,
wherein the correction controller determines the third correction value in such a way that a DC offset that occurs at a stage prior to the phase shifter is removed.

5. The phased array transmission device according to claim 1,
wherein the plurality of candidates $\theta_n$ for the phase rotation amount are expressed by the equation below, $$\theta_n = \frac{2\pi}{N}n + \theta_a$$

where n=0, 1, ..., N−1;
N is an integer that is equal to or greater than 2; and
θa is an arbitrary phase.

6. The phased array transmission device according to claim 5,
wherein N=2.

7. The phased array transmission device according to claim 1,
wherein, while a DC offset correction is being performed in at least one of the transmission branches from among the plurality of transmission branches, a power source for the other transmission branches for which the DC offset correction is not being performed is put into an on state.

8. The phased array transmission device according to claim 1,
wherein each of the transmission branches is further provided with:
a power amplifier that amplifies, to a predetermined power, a signal that is output from the mixer; and
a transmission antenna that transmits, as a radio signal, a signal that is output from the power amplifier, and,
while a DC offset correction is being performed in at least one of the transmission branches from among the plurality of transmission branches, a power source for the power amplifiers of the other transmission branches for which the DC offset correction is not being performed is put into an off state.

9. A phased array transmission device, comprising:
a plurality of transmission branches, each being provided with
a first DC offset corrector that performs a first DC offset correction by adding a first correction value to a baseband signal,
a phase shifter that applies a phase rotation to an output signal of the first DC offset corrector,
a second DC offset corrector that performs a second DC offset correction by adding a second correction value to an output signal of the phase shifter,
a mixer that performs quadrature modulation with respect to an output signal of the second DC offset corrector and upconverts a frequency conversion to a high frequency band, and
a detector that detects, using the baseband signal from prior to the phase rotation, a first DC offset that occurs at a stage prior to the phase shifter; and
a correction controller that determines the first correction value on the basis of the first DC offset.

10. The phased array transmission device according to claim 9,
wherein the correction controller determines the second correction value in such a way that a second DC offset that occurs at the mixer is removed, after the first DC offset corrector has performed a DC offset correction using the first correction value.

11. The phased array transmission device according to claim 9,
wherein, while a DC offset correction is being performed in at least one of the transmission branches from among the plurality of transmission branches, a power source for the other transmission branches for which the DC offset correction is not being performed is put into an on state.

12. The phased array transmission device according to claim 9,
wherein each of the transmission branches is further provided with:
a power amplifier that amplifies, to a predetermined power, a signal that is output from the mixer; and
a transmission antenna that transmits, as a radio signal, a signal that is output from the power amplifier, and,
while a DC offset correction is being performed in at least one of the transmission branches from among the plurality of transmission branches, a power source for the power amplifiers of the other transmission branches for which the DC offset correction is not being performed is put into an off state.

13. A carrier leak correction method, including:
phase shifting, by a phase shifter, a phase rotation applied to a baseband signal;
correcting, by a DC offset corrector, a DC offset correction by adding a first correction value to an output signal of the phase shifter;
performing, by a mixer, quadrature modulation with respect to an output signal of the DC offset corrector and up-converting a frequency conversion to a high frequency band; and
calculating, by a correction controller, a second correction value with which a carrier leak component included in an output of the mixer is minimized, for each of a plurality of candidates for a phase rotation amount that is set for the phase rotation, and the first correction value is determined on the basis of the second correction value.

14. A carrier leak correction method, including:
correcting, by a first DC offset corrector, a first DC offset correction by adding a first correction value to a baseband signal;
phase shifting, by a phase shifter, a phase rotation applied to an output signal of the first DC offset corrector;

correcting, by a second DC offset corrector, a second DC offset correction by adding a second correction value to an output signal of the phase shifter;

performing, by a mixer, quadrature modulation with respect to an output signal of the second DC offset corrector and up-converting a frequency conversion to a high frequency band;

detecting a DC offset that occurs at a stage prior to the phase shifting is detected using the baseband signal from prior to the phase rotation; and correction controlling the first correction value determined on the basis of the first DC offset.

* * * * *